April 24, 1951 W. A. RAY 2,550,022
EXPANSION VALVE
Filed June 4, 1947
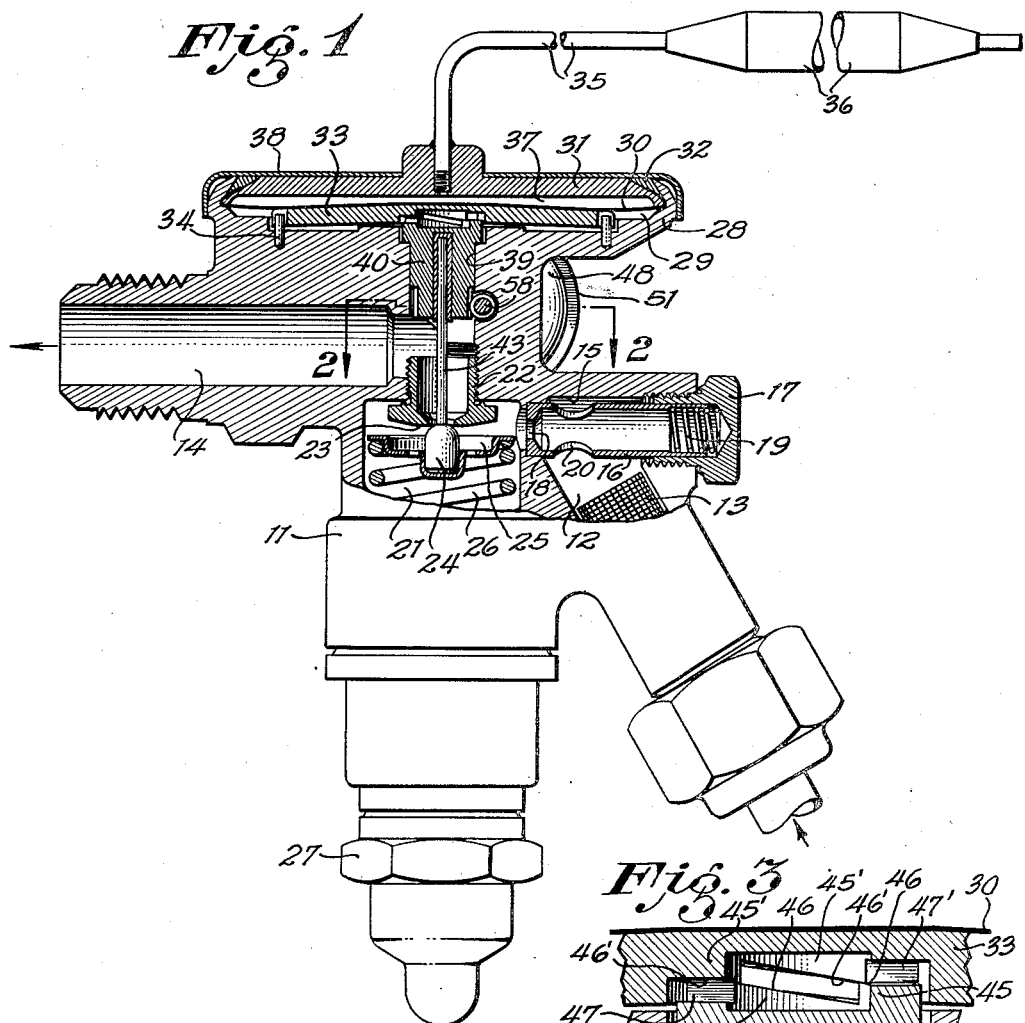
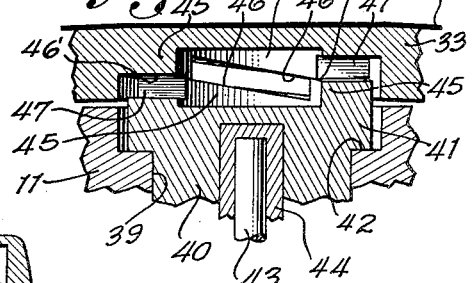
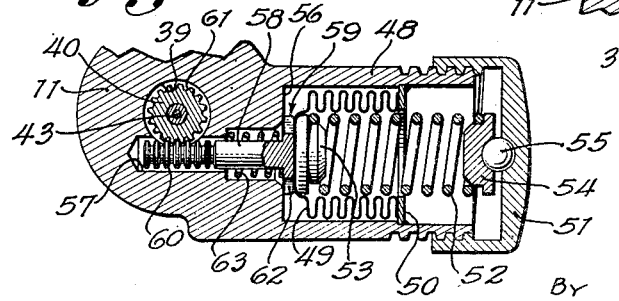
INVENTOR,
WILLIAM A. RAY
BY
John H. Rouse,
ATTORNEY Patented Apr. 24, 1951

2,550,022

UNITED STATES PATENT OFFICE 2,550,022

EXPANSION VALVE

William A. Ray, North Hollywood, Calif., assignor to General Controls Co., Glendale, Calif., a corporation of California Application June 4, 1947, Serial No. 752,376

5 Claims. (Cl. 236—92)

My present invention relates to improvements in thermostatic expansion valves employed in multiple-unit refrigerating systems; a general object of the invention being to provide means for automatically closing the valve, irrespective of the condition of the thermostatic operating means, upon predetermined rise of pressure in the outlet of the valve, so as to prevent overloading of the refrigerant compressor.

To accomplish this object it has been proposed to interpose a fluid-charged pressure-responsive unit between the thermostatic operator and the valve. One obvious disadvantage of such an arrangement is that, in order to change the maximum limit of outlet pressure, it is necessary to disassemble the valve, at least partially, and substitute a unit having a different pressure setting.

To avoid the necessity for such procedure, it is a more specific object of this invention to provide means, adjustable from outside the valve, for determining the maximum outlet-pressure at which the valve will pass refrigerant.

Another object is to provide pressure-limiting means, of the character described, which includes a leverage system whereby the ratio of movement of the pressure-responsive member to the movement of the valve is increased.

For full understanding of the invention, and further appreciation of its objects and advantages, reference is to be had to the following detailed description and accompanying drawing, and to the appended claims.

In the drawing:

Figure 1 is a view, mainly in section, of a thermostatic expansion valve embodying the invention;

Figure 2 is a fragmentary transverse section taken along the line 2—2 of Fig. 1 and rotated clockwise through 90°; and Figure 3 is a fragmentary enlargement of the cam means shown in Fig. 1.

In the drawing, the numeral 11 indicates a valve casing having an inlet passage 12, containing the usual strainer 13, and an outlet passage 14. Within an opening 15, bored through a thickened side portion of the casing and communicating with the inlet passage, is an interchangeable orifice cartridge for determining the flow capacity of the valve, of the type disclosed in Matteson Patent No. 2,327,542. This cartridge consists of a tubular member 16 which is supported at its outer end in the hollow of a threaded cap 17 closing the opening. The other end of the tubular member, which is closed except for a central orifice 18, fits in a recess and against a shoulder formed by reduced extensions of the opening 15, a compression spring 19 maintaining the member in tight engagement with the shoulder. In the side wall of member 16 are openings 20 through which refrigerant can enter and pass, by way of the orifice 18, into a chamber 21.

Threaded in an opening in the top wall of the chamber 21, which opening intersects the outlet passage 14 at its inner end, is a cupped member 22 whose ported bottom wall 23 provides a valve seat cooperable with the hemispherical upper end of a closure 24. The closure is supported in a dished washer 25 and biased upwardly toward seating position by a compression spring 26 whose force can be varied in the usual manner by means (not shown) in the bottom of the valve casing and accessible upon removal of a sealing cap 27.

At the top of the valve casing is a circular head 28 having a shallow recess 29 for receiving a fluid-pressure motor comprising a thin metallic diaphragm 30 which is clamped at its margin between a shoulder in the recess and a cover 31 secured to the head by the rolled-over rim of the head and by solder 32. Below the diaphragm 30, for transmitting movement of the same, is a dished pusher-plate 33 which is restrained from rotation by means of pins 34 secured in the casing and cooperating with notches in the rim of the plate. Connected to the motor by a capillary tube 35, sealingly secured in an opening through the cover 31, is a feeler-bulb 36 which, as well as the pressure chamber 37 defined by the diaphragm and the cover, is charged with thermally expansible fluid, so that operation of the motor is controlled in accordance with the temperature of the bulb. Covering the top of the casing-head is a name-plate 38.

In a bore 39 leading downwardly from the recess 29, and concentric with the opening wherein the seat member 22 is mounted, is a round element 40. The upper end of the bore 39 is enlarged to freely receive the head 41 (see Fig. 3) of the element 40 and to form a shoulder 42 which limits its downward movement. In the bottom of element 40 is a concentric bore for the stem 43 of the valve closure 24; a liner 44 being interposed between the stem and the bore to form a bearing which ensures free rotation of the element 40 with respect to the valve stem.

Interconnecting the pusher-plate 33 and the element 40 is cam means comprising a plurality of teeth 45 formed around the top surface of the head 41 and cooperating with like teeth 45′ formed in a depression in the underside of the pusher-plate; there being three teeth in each set in the arrangement shown. Each tooth has an inclined top surface 46 and a vertical end surface 47; the surfaces of the upper set of teeth being indicated by primed numerals.

As seen in the drawing, the cam means is in the condition wherein there is substantially maximum separation of the pusher-plate and element 40. If the element is rotated (by means hereinafter to be described) in counterclockwise direction (as viewed from the top), the inclined surfaces 46 slide on the cooperating stationary surfaces 46' so that the element 40 rises under the force of the valve spring 26; the length and inclination of the surfaces 46—46', and other arrangement of the parts, being such that the valve closes before the teeth are completely nested— even when the pusher-plate is in its fully-depressed position, as shown, in response to relatively-high temperature at the feeler-bulb. It is to be understood that the clearance between element 40 and bore 39 is sufficient to permit the whole underside of the diaphragm and pusher plate to be subjected to the fluid pressure in the outlet 14, as in conventional valves of this general character.

Projecting from the back of the valve casing is a boss 48 which, as seen in Fig. 2, is bored to provide a housing for an expensible-contractible metallic bellows 49 whose mouth is soldered to an apertured disk 50 which, in turn, is soldered to the side wall of the housing. Screwed on the open end of the boss 48 is a cap 51, between which and the head or end-wall of the bellows a spring 52 is compressed; buttons 53 and 54 being interposed at both ends of the spring, as well as a friction-reducing ball 55 at the cap.

Bored in the end wall 56 of the bellows-housing is an opening 57 which intersects the casing-bore 39 at one side. Within the opening 57 is a rod 58 having a head 59 which abuts the end-wall of the bellows 49 and is normally held in engagement with the wall 56 by the force of the bellows-spring. The inner end-portion of the rod 58 is grooved to provide teeth 60 which mesh with teeth 61 cut in the periphery of the element 40 at its lower end; the teeth 60 constituting the rod 58 a circular rack.

The rod-head 59 is notched, as indicated at 62, so that the bellows 49 is continuously subjected, through bore 39 and opening 57, to the pressure existing in the outlet 14 of the valve casing; the end-wall of the bellows being moved outwardly against the force of spring 52 upon rise of outlet pressure. Under the force of a spring 63, compressed below its head, the rod 58 follows the outward movement of the bellows and thus effects counterclockwise rotation of the element 40 so that, as described hereinabove, the valve closure 24 is moved toward its seat. By rotation of the cap 51 the force of spring 52 can be varied to determine the maximum outlet-pressure at which the valve will pass refrigerant. The fit of cap 51 on the boss is such that leakage can occur between them, so that the interior of the bellows is constantly at atmospheric pressure.

From the foregoing it is apparent that the outlet pressure acting on the movable wall (constituted by the bellows-head) produces, through the rack-and-pinion arrangement, such variation of the effective length of the connection (formed by the element 40 and the pressure-plate element) between the thermostatic motor and the valve that the valve is throttled or entirely closed in accordance with the outlet pressure. The leverage afforded by the rack-and-pinion and the cam means permits a range of movement of the bellows large enough that accurate setting of the outlet-pressure limit is readily accomplished by manipulation of the bias-adjusting cap.

To facilitate understanding of some of the appended claims, it is pointed out that the "first movable wall" and the "second movable wall" recited therein are exemplified, in the specific construction illustrated, by the diaphragm 30 of the thermostatic motor, and by the head of bellows 49, respectively.

The specific embodiment of my invention herein shown and described is obviously susceptible of modification without departing from the spirit of the invention, and I intend therefore to be limited only by the scope of the appended claims.

I claim as my invention:

1. In a thermostatic expansion valve: a valve casing having walls defining an inlet and an outlet chamber; valve means for controlling flow of refrigerant between said chambers; a fluid-pressure motor mounted on said casing and comprising a first movable wall sealingly closing an opening through the wall of said outlet chamber so that the inner surface of the first movable wall is subjected to the pressure of fluid in the outlet chamber; means within said outlet chamber forming a connection through which movement of the first movable wall normally effects operation of said valve means, the arrangement being such that outward movement of the first movable wall is in a direction to effect closing of the valve means; thermostatic means outside the casing, and acting on the outer surface of said first movable wall, for so controlling the operation of said motor so as to effect movement of said first movable wall in accordance with temperature variations; a second movable wall sealingly closing another opening through the wall of said outlet chamber; a spring urging said second movable wall inwardly of the casing; means accessible outside the valve for adjusting the force of said spring; and means, operated by outward movement of said second movable wall and cooperating with said connection, for closing said valve means upon predetermined rise of pressure in said outlet chamber irrespective of the position of said first movable wall.

2. In a thermostatic expansion valve: a valve casing having walls defining an inlet and an outlet chamber; valve means for controlling flow of refrigerant between said chambers, and biased to closed position; a fluid-pressure motor mounted on said casing and comprising a first movable wall sealingly closing an opening through the wall of said outlet chamber so that the inner surface of the first movable wall is subjected to the pressure of fluid in the outlet chamber; means within said outlet chamber forming a longitudinally-movable elongated connection through which movement of said first movable wall normally effects operation of said valve means, the arrangement being such that outward movement of the first movable wall is in a direction to effect closing of the valve means; thermostatic means outside the casing, and acting on the outer surface of said first movable wall, for so controlling the operation of said motor as to effect movement of said first movable wall in accordance with temperature variations; a second movable wall sealingly closing another opening through the wall of said outlet chamber, the outer side of the second movable wall being subjected to atmospheric pressure; a spring urging said second movable wall inwardly of the casing; means accessible outside the valve for adjusting the force of said spring; and means, operated by outward movement of said second movable wall, for so varying the effective length of said connection that said valve means is closed by the force of its aforementioned bias upon predetermined rise of pressure in said outlet chamber irrespective of the position of said first movable wall.

3. A thermostatic expansion valve as defined in claim 2, and wherein said means for varying the effective length of said connection comprises cam means interposed between sections of the connection.

4. In a thermostatic expansion valve: a valve casing having walls defining an inlet and an outlet chamber; valve means for controlling flow of refrigerant between said chambers, and biased to closed position; a fluid-pressure motor mounted on said casing and comprising a first movable wall sealingly closing an opening through the wall of said outlet chamber so that the inner surface of the first movable wall is subjected to the pressure of fluid in the outlet chamber; means within said outlet chamber forming a longitudinally-movable elongated connection through which movement of said first movable wall normally effects operation of said valve means, said connection including a pair of relatively rotatable elements, the arrangement being such that outward movement of the first movable wall is in a direction to effect closing of the valve means; cam means interconnecting said elements whereby relative rotation of the elements effects variation of the effective length of the connection; thermostatic means outside the casing, and acting on the outer surface of said first movable wall, for so controlling the operation of said motor as to effect movement of said first movable wall in accordance with temperature variations; a second movable wall sealingly closing another opening through the wall of said outlet chamber, the outer side of the second movable wall being subjected to atmospheric pressure; a spring urging said second movable wall inwardly of the casing; means accessible outside the valve for adjusting the force of said spring; and means, operated by outward movement of said second movable wall, for effecting such relative rotation of said elements that said valve means is closed by the force of its aforementioned bias upon predetermined rise of pressure in said outlet chamber irrespective of the position of said first movable wall.

5. In a thermostatic expansion valve: a casing having an inlet and an outlet; a valve controlling flow of refrigerant from said inlet to said outlet, and biased to closed position; a motor mounted on said casing; thermostatic means outside the casing for controlling said motor; means whereby said motor can operate said valve and including a longitudinally-movable elongated connection; said connection including a pair of elements, one of which is rotatable relative to the other; cam means interconnecting said elements whereby rotation of said rotatable element effects variation of the effective length of said connection; gear teeth on the periphery of said rotatable element; a movable wall sealingly closing an opening through a wall of the casing and disposed in a plane parallel to the axis of said connection, said movable wall being subjected on one side to the pressure in said outlet and on its other side to atmospheric pressure; means, extending outside of the casing, for applying to said movable wall a manually-variable resilient force opposing said outlet pressure; means extending inwardly from said movable wall and formed to provide a rack cooperable with the gear-teeth of said rotatable element, the arrangement being such that movement of the movable wall in response to rise of outlet pressure effects such variation of the length of said connection as to effect closing movement of said valve.

WILLIAM A. RAY.

REFERENCES CITED

The following references are of record in the file of this patent:

UNITED STATES PATENTS

| Number | Name | Date |
|---|---|---|
| 1,934,982 | Jones | Nov. 14, 1933 |
| 1,978,709 | Hill | Oct. 30, 1934 |
| 2,192,117 | Wile | Feb. 27, 1940 |
| 2,201,728 | Hoesel | May 21, 1940 |
| 2,335,824 | Dillman | Nov. 30, 1943 |
| 2,416,453 | Mather et al. | Feb. 25, 1947 |